J. L. GOULET.
BEET TOPPER.
APPLICATION FILED MAR. 27, 1915.

1,220,977.

Patented Mar. 27, 1917.
3 SHEETS—SHEET 1.

J. L. GOULET.
BEET TOPPER.
APPLICATION FILED MAR. 27, 1915.

1,220,977.

Patented Mar. 27, 1917.
3 SHEETS—SHEET 3.

Inventor:
John L Goulet
by
Townsend Graham + Lewis
his attorneys

UNITED STATES PATENT OFFICE.

JOHN L. GOULET, OF LOS ANGELES, CALIFORNIA.

BEET-TOPPER.

1,220,977. Specification of Letters Patent. Patented Mar. 27, 1917.

Application filed March 27, 1915. Serial No. 17,557.

*To all whom it may concern:*

Be it known that I, JOHN L. GOULET, a citizen of the United States, residing at Los Angeles, in the county of Los Angeles and State of California, have invented a new and useful Beet-Topper, of which the following is a specification.

My invention relates to the art of harvesting beets or other roots, and the principal object of the invention is to produce a machine that will cut off the tops from the beets while they are still in the ground, utilizing novel mechanism for so doing.

A further object of the invention is to provide such a beet topper with a novel form of top shedder which will remove the rejected portion of the beet with its tops from above the cutting knives, depositing such rejected material to one side of the row of beets being topped.

Further objects and advantages will be evident hereinafter.

Figure 1:
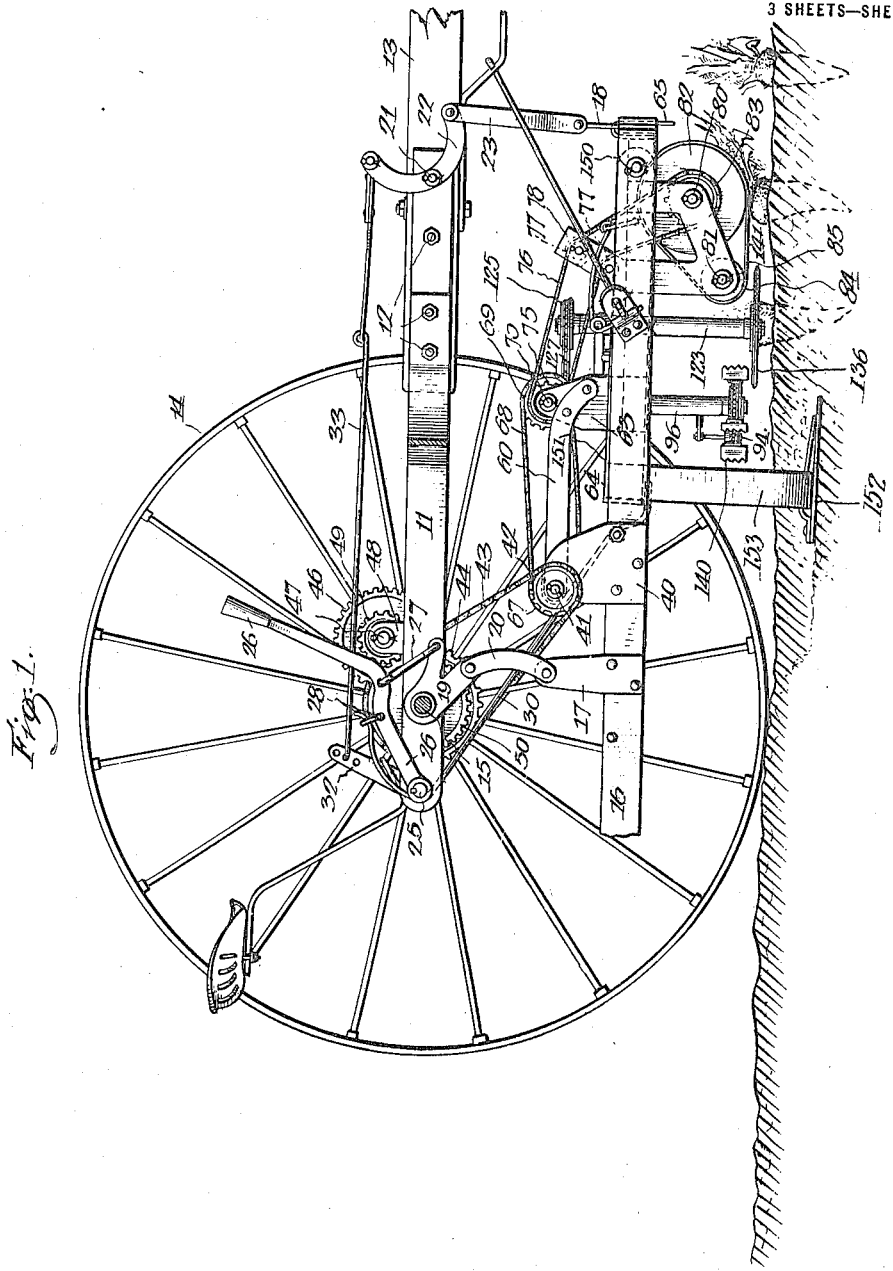

In the drawings which are for illustrative purposes only:
Figure 1 is a side view of a beet topper embodying my invention.

Figure 2:
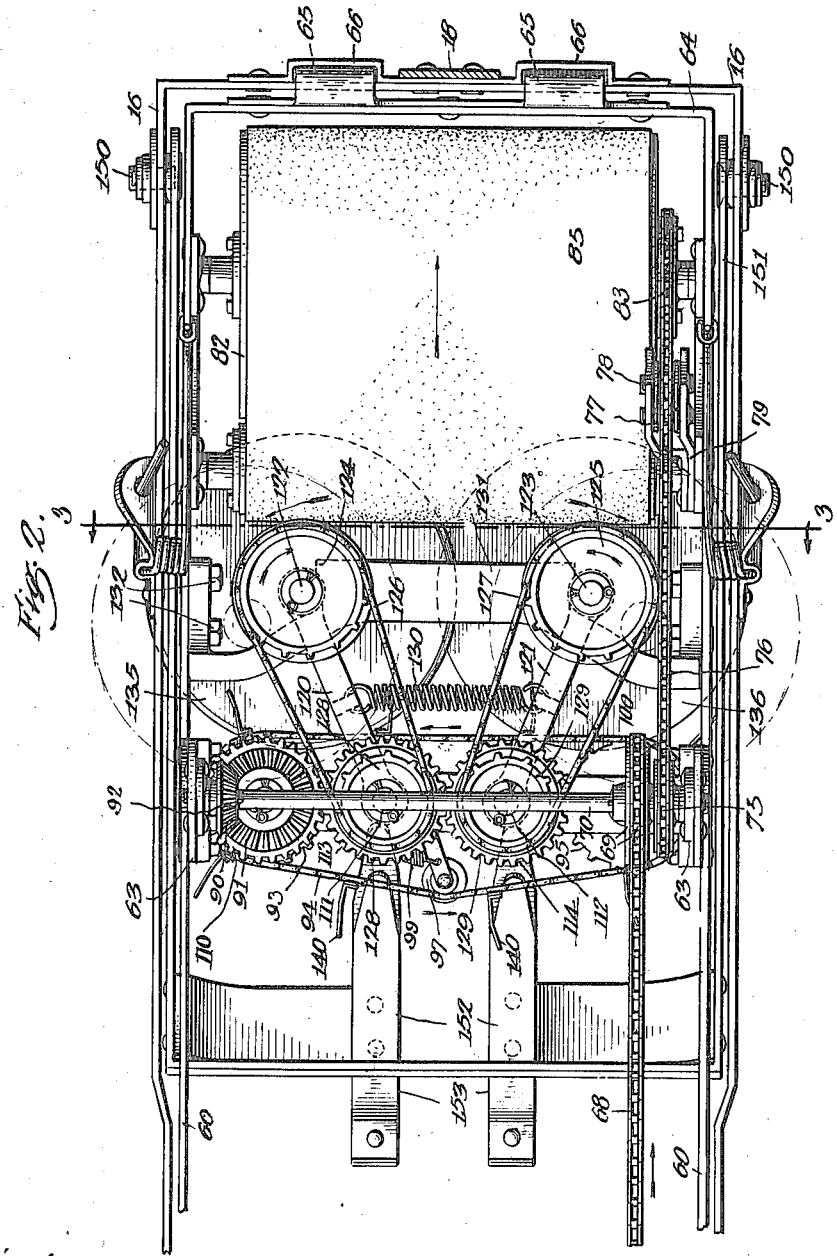
Figure 3:
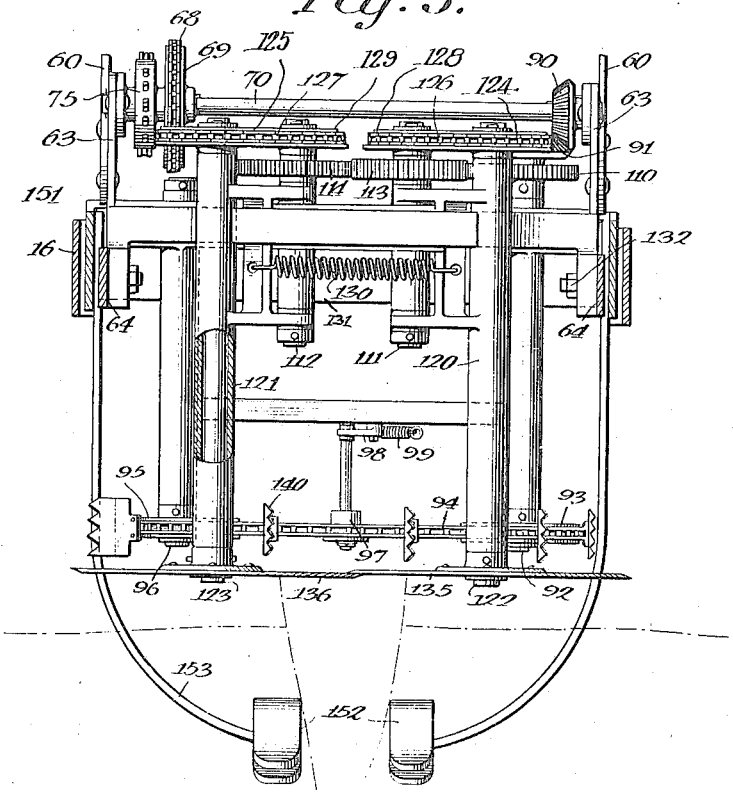
Figure 4:
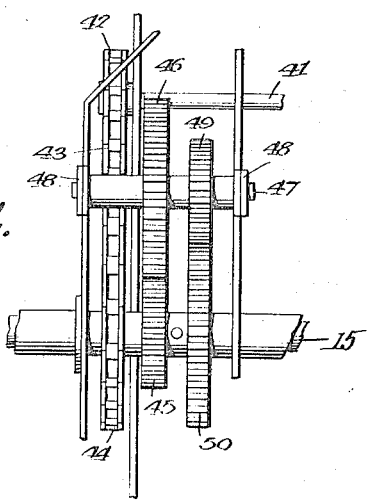

Fig. 2 is a plan view on an enlarged scale of the forward portion of the mechanism shown in Fig. 1.
Fig. 3 is a section on the same scale as Fig. 2, this section being taken on the plane indicated by the line 3—3 of Fig. 2, said plane being viewed in the direction of the arrows of that figure.
Fig. 4 is a plan view of a portion of the driving mechanism.

In the form of my invention illustrated in the drawings, a main frame 11 is provided, which frame is secured by means of bolts 12 to a tongue 13 to which any suitable draft means may be attached. Wheels 14 are mounted on an axle 15 which turns freely in the main frame 11. An auxiliary frame 16 is provided, this frame being provided with a pair of rear plates 17 one on each side thereof, and a single front plate 18 in the center thereof.

Pivoted on the axle 15 are a pair of rear bell cranks 19 which are connected by pivoted links 20 to the plates 17. Pivoted on a bolt 21 is a forward bell crank 22 which is connected by a single link 23 with the front plate 18. A hand lever shaft 25 extends across the main frame 11 and has hand levers 26 rigidly fixed thereto. The hand levers 26 are connected by links 27 with the bell cranks 19, and are connected by links 28 with a spring 29, this spring surrounding the shaft 25 and extending down as shown at 30 for reasons which will be explained hereinafter.
Centrally secured to the shaft 25 is a lever 32 which is connected through a pull rod 33 with the upper end of the bell crank 22. The purpose of the hand levers 26 and their connected parts is to raise the digging mechanism from the ground when the machine is not in operation.

Mounted on the two sides of the auxiliary frame 16 are a pair of pivot plates 40, and extending across the machine is a pivot shaft 41 upon which a sprocket 42 is secured. This sprocket is driven through a chain 43 from a sprocket 44. The sprocket 44 is rigidly connected to a gear 45 which meshes with a gear 46 carried in an idler shaft 47 which is mounted in bearings on plates 48. The gear 46 is rigidly connected to a gear 49 also turning on the shaft 47, and the gear 49 meshes with a gear 50 which is rigidly connected to the axle 15. The above apparatus is so arranged that the sprocket 42 is driven as the machine is pulled through the field.

Pivoted on the shaft 41 are a pair of bars 60, these bars extending forward and being rigidly fixed to a pair of plates 63 which are secured to the inside of a topping frame 64. This topping frame 64 is provided with a pair of bent straps 65 which extend through sockets 66 formed on the auxiliary frame 16, the topping frame 64 being free to move up and down about the shaft 41 as an axis.

Mounted on the shaft 41 is a second sprocket 67 which is connected through a chain 68 with a sprocket 69 rigidly fixed to a shaft 70, the shaft 70 turning in bearings in the plate 63. Rigidly mounted on the shaft 70 is a sprocket 75 over which a chain 76 passes, this chain passing over idler sprockets 77 carried on a projection 78 of a bracket 79. Turning freely in bearings in the bracket 79 is a large roll shaft 80 and a small roll shaft 81. Fixed on the shaft 80 is a large roll 82 and a sprocket 83 over which the chain 76 passes. Fixed on the shaft 81 is a small roll 84, and passing over the rolls 82 and 84 is an endless flexible belt 85. The bracket 79 is secured by means of rivets inside the topping frame 64.

Rigidly secured to the shaft 70 on the opposite end from the sprocket 69 is a bevel pinion 90, this pinion meshing with a bevel gear 91 carried on a shedder shaft 92. A sprocket 93 is provided on the shedder shaft 92, and a chain 94 passes around the sprocket and around a similar sprocket 95 mounted on a second shedder shaft 96. An idler 97 carried on an arm 98 and actuated by a spring 99 tends to keep the chain 94 in taut condition. The shafts 92 and 96 are mounted in bearings formed in a casting 100, this casting being secured to the inside of the topping frame 64.

A spur gear 110 is also mounted on the shaft 92 and drives shafts 111 and 112 through gears 113 and 114. Pivoted on the shafts 111 and 112 are arms 120 and 121, these arms carrying at their outer end journals in which shafts 122 and 123 are free to turn. Mounted on the shafts 122 and 123 are sprockets 124 and 125, these sprockets being driven by means of chains 126 and 127 from sprockets 128 and 129 carried on the shafts 111 and 112. A spiral tension spring 130 extends across between the arms 120 and 121 and tends to pull them together. A stop casting 131 is secured inside the topping frame 64 by means of bolts 132 and prevents the arms 120 and 121 from approaching each other more than a certain distance. Carried on the bottom of the shafts 122 and 123 are a pair of cutting knives 135 and 136, these knives consisting of flat disks with their edges overlapping, the knives being so placed that they project under the belt 85, as shown in Fig. 1. Mounted on the chain 94 are a series of fingers 140, these fingers serving to seize upon and remove any tops resting on top of the knives 135 and 136.

Pivoted on pins 150 in the forward end of the auxiliary frame 16 are the forward ends of a digging frame 151, which in turn carries digging shoes 152 on arms 153.

The method of operation is as follows:

When the beet topper is being transferred from place to place, the auxiliary frame 16 is held in the raised position, the hand lever 26 being pulled back to its extreme rear position. When it is desired to top beets the handle 26 is pushed forward and the parts assume the position shown in Fig. 1. As the beet topper is pulled through the field the large roll 83 climbs upon the beets being driven at a speed slightly faster than the travel of the topper. The topping frame swings up and down about the shaft 41, the cutting knives 135 and 136 rising and falling to suit the height of the beet. The distance between these knives and the surface of the belt 85 is however constant as the knives and belt and all fixed in position with relation to the topping frame 64 on which they are carried. As the belt 85 passes over the beets they are held steady in the ground so that the knives 135 and 136 can get a solid structure to cut on. The knives sever the beets and the top and leaves are caught by the fingers 140 and delivered to one side of the machine. The beet proper is then dug up by the shoes 152.

I claim as my invention:

1. In a beet harvester having a cutting means which may be raised or lowered to suit the height of the beets, a gaging means for regulating the height of the cutting means, said gaging means comprising a large roller in advance of the cutting means, a small roller directly over the cutting means, a flexible belt passing over said rollers, and means whereby said rollers are driven by the axle of the harvester in such a direction and at such a speed that the lower lap of the belt is approximately stationary with regard to the ground.

2. In a beet topper, a pair of cutting disks, a pair of vertical cutting disk shafts each having one of said disks rigidly secured to the lower end thereof, a pair of driving shafts parallel to said cutting disk shafts, a pair of swinging arms each arm being pivoted to swing about the center of one of said driving shafts and having a journal in its other end in which one of said cutting disk shafts is journaled, means by which each of said driving shafts will drive one of said cutting disk shafts, and spring means for holding said arms in such a position that the cutting disks are in coöperation with each other.

3. In a beet topper, a supporting frame, a pair of vertical driving shafts journaled in said frame, a pair of wheels from which said frame is partially supported, means by which said driving shafts are driven by the rotation of said wheels, a pair of cutting disks, a pair of cutting disk shafts, each of said cutting disk shafts having a cutting disk rigidly secured at its lower end, a pair of arms, each arm being pivoted at one end to one of said vertical driving shafts and being journaled at the other end to receive one of said cutting disk shafts, a pair of driving sprockets each secured on one of said driving shafts, a pair of driven sprockets each secured on one of said cutting disk driving shafts, a pair of chains each passing around one of said driving sprockets and one of said driven sprockets, means on said frame for limiting the angular movement of each of said arms, and spring means for holding said arms in their inner position.

4. In a beet topper, a supporting frame, a pair of vertical driving shafts journaled in said frame, a pair of wheels from which said frame is partially supported, means by which said driving shafts are driven by the rotation of said wheels, a pair of cutting disks, a pair of cutting disk shafts, each of said cutting disk shafts having a cutting disk rigidly secured at its lower end, a pair of arms, each arm being pivoted at one end to one of said vertical driving shafts and being journaled at the other end to receive one of said cutting disk shafts, a pair of driving sprockets each secured on one of said driving shafts, a pair of driven sprockets each secured on one of said cutting disk driving shafts, a pair of chains each passing around one of said driving sprockets and one of said driven sprockets, a pair of shedder chain sprocket shafts each journaled in said frame, means for driving one of said shedder chain sprockets from one of said driving shafts, a pair of shedder chain sprockets each rigidly secured to the lower end of one of said shedder chain sprocket shafts slightly above said cutting disks, a shedder chain passing around said shedder chain sprockets, fingers on said chain so formed that they sweep across the top of said cutting disks for the purpose of removing tops therefrom, means on said frame for limiting the angular movement of each of said arms, and spring means for holding said arms in their inner position.

5. In a beet topper, a pair of cutting disks, a pair of vertical shafts on each of which one of said disks is mounted, a pair of swinging arms in each of which one of said shafts is mounted, and spring means for holding said arms in the cutting position.

6. In a beet topper, a pair of rollers, an apron passing over said rollers, and a pair of cutting disks extending under one of said rollers and said apron in such a position as to cut a beet held by said apron.

In testimony whereof, I have hereunto set my hand at Los Angeles, California, this 22nd day of March, 1915.

JOHN L. GOULET.

In presence of:
FRED A. MANSFIELD,
FORD W. HARRIS.